US012506254B2

(12) United States Patent
Ye

(10) Patent No.: US 12,506,254 B2
(45) Date of Patent: Dec. 23, 2025

(54) ANTENNA APPARATUS AND BASE STATION ANTENNA

(71) Applicant: ZTE Corporation, Guangdong (CN)

(72) Inventor: Kai Ye, Guangdong (CN)

(73) Assignee: ZTE Corporation, Shenzhen (CN)

( * ) Notice: Subject to any disclaimer, the term of this patent is extended or adjusted under 35 U.S.C. 154(b) by 96 days.

(21) Appl. No.: 18/402,555

(22) Filed: Jan. 2, 2024

(65) Prior Publication Data

US 2024/0136704 A1 Apr. 25, 2024
US 2024/0235011 A9 Jul. 11, 2024

Related U.S. Application Data

(63) Continuation of application No. PCT/CN2022/101579, filed on Jun. 27, 2022.

(30) Foreign Application Priority Data

Jul. 2, 2021 (CN) ......................... 202110751219.5

(51) Int. Cl.
*H01Q 3/26* (2006.01)
*H01Q 1/24* (2006.01)

(52) U.S. Cl.
CPC ............... *H01Q 1/246* (2013.01); *H01Q 3/26* (2013.01)

(58) Field of Classification Search
CPC ............ H01Q 1/246; H01Q 1/36; H01Q 3/26; H01Q 3/34; H01Q 3/40; H01Q 21/00;
(Continued)

(56) References Cited

U.S. PATENT DOCUMENTS 5,923,289 A 7/1999 Buer et al.
2002/0021246 A1 2/2002 Martek et al.
(Continued)

FOREIGN PATENT DOCUMENTS

CN 105742828 A 7/2016
CN 206003971 U 3/2017
(Continued)

OTHER PUBLICATIONS

International Search Report and Written Opinion for International Application No. PCT/CN2022/101579, mailed on Sep. 21, 2022. 16 pages with translation.
(Continued)

*Primary Examiner* — Hoang V Nguyen
(74) *Attorney, Agent, or Firm* — Perkins Coie LLP

(57) ABSTRACT

The embodiments of the present application relate to the technical field of wireless communications. Disclosed are an antenna apparatus and a base station antenna, wherein the antenna apparatus comprises an antenna array. The antenna array comprises M linear array units, which are arranged and spaced apart from each other in a first direction, wherein each linear array unit comprises a plurality of radiation units, which are arranged and spaced apart from each other in a second direction; and N adjacent linear array units in the antenna array are arranged in a staggered manner in the second direction, wherein M and N are both integers greater than 1, and N is less than or equal to M.

16 Claims, 4 Drawing Sheets

(58) Field of Classification Search
CPC .. H01Q 21/005; H01Q 21/064; H01Q 21/065; H01Q 21/08
See application file for complete search history.

(56) References Cited

U.S. PATENT DOCUMENTS

| | | | | |
|---|---|---|---|---|
| 2014/0028513 | A1 | 1/2014 | Deng et al. | |
| 2018/0302175 | A1 | 10/2018 | Yuan et al. | |
| 2020/0403325 | A1 * | 12/2020 | Wu | H01Q 21/061 |

FOREIGN PATENT DOCUMENTS

| | | | | |
|---|---|---|---|---|
| CN | 110943295 | A | 3/2020 | |
| EP | 4207495 | A1 | 7/2023 | |
| JP | 2000082920 | A | 3/2000 | |
| JP | 2002533003 | A | 10/2002 | |
| JP | 2010200166 | A | 9/2010 | |
| JP | 2020153869 | A | 9/2020 | |
| KR | 2000-0011017 | A | 2/2000 | |
| WO | WO-2019116970 | A1 * | 6/2019 | H01Q 21/24 |
| WO | WO-2020105404 | A1 * | 5/2020 | H01Q 21/06 |
| WO | 2022061937 | A1 | 3/2022 | |

OTHER PUBLICATIONS

European Search Report issued in EP Patent Application No. 22831973.7, dated Oct. 10, 2024, 9 pages.
Wang et al., "Grating Lobe Reduction in a Phased Array of Limited Scanning," IEEE Transactions on Antennas and Propagation, vol. 56, No. 6, Jun. 2008, pp. 1581-1586, 6 pages.
Japanese office action issued in JP Patent Application No. 2023-580905, dated Jan. 28, 2025, 10 pages. English translation included.
KIPO, Office Action for Korean Application No. 10-2024-7002600, mailed on Apr. 22, 2025, 10 pages with unofficial English translation.

* cited by examiner

ANTENNA APPARATUS AND BASE STATION ANTENNA

CROSS-REFERENCE TO RELATED APPLICATIONS

This application is a continuation of International Patent Application No. PCT/CN2022/101579, filed on Jun. 27, 2022, which claims priority to Chinese Patent Application No. 202110751219.5, filed on Jul. 2, 2021, the disclosures of each of which are incorporated herein by reference in their entireties.

FIELD

Embodiments of the present disclosure relate to the field of wireless communication technology, and specifically to an antenna apparatus and a base station antenna.

BACKGROUND

In the high-frequency base station AAU (Active Antenna Unit) active antenna system, as there is a great loss in millimeter wave band path, the beamforming technology is required to enable the antenna to attain a high directional gain. Different from the mid- and low-frequency fully digital beamforming, 5G high frequency mainly adopts the beamforming circuit with digital-analog hybrid architecture, where the analogue shifter behind the antenna element is used to adjust the phase of the element for beamforming.

In the base station antenna, the EIRP (equivalent isotropically radiated power) can be boosted by increasing the transmit power of the beamforming circuit, or enlarging the antenna array surface, to thus improve the communication system performance. Due to the low output power of the high-frequency single-channel power amplifier in the antenna beamforming circuit, the method of enlarging the antenna array surface is typically employed to improve the EIRP. However, as the diameter of the antenna array is increased, the antenna beam width is inevitably decreased, and the grating lobes of the large-angle beams are increased, thus leading to shrinkage in antenna beam coverage.

SUMMARY

Some embodiments of the present disclosure provide an antenna apparatus comprising an antenna array, in which the antenna array comprises M linear array units arranged and spaced apart from each other in a first direction, each of the linear array units comprises a plurality of radiation units arranged and spaced apart from each other in a second direction, and N of the linear array units adjacent in the antenna array are arranged in a staggered manner in the second direction, where the M and the N are both integers greater than 1, and the N is less than or equal to the M.

Some embodiments of the present disclosure provide a base station antenna, comprising the antenna apparatus as described above.

DETAILED DESCRIPTION OF EMBODIMENTS

The objective, technical solution and advantages of embodiments of the present disclosure will become more apparent, through the following detailed description of embodiments of the present disclosure with reference to the accompanying drawings. It would be appreciated by those skilled in the art that, in the various embodiments of the present disclosure, many technical details are provided to enable readers to better understand the present disclosure. However, even without those technical details and various changes and modifications to the embodiments described below, the technical solution according to the present disclosure could still be implemented. Division of the following embodiments is provided for convenience of description, which should not be construed as any limitation to the specific implementation of the present disclosure, and various embodiments could be combined with, or refer to, one another in the case of no conflict occurring.

Figure 1:
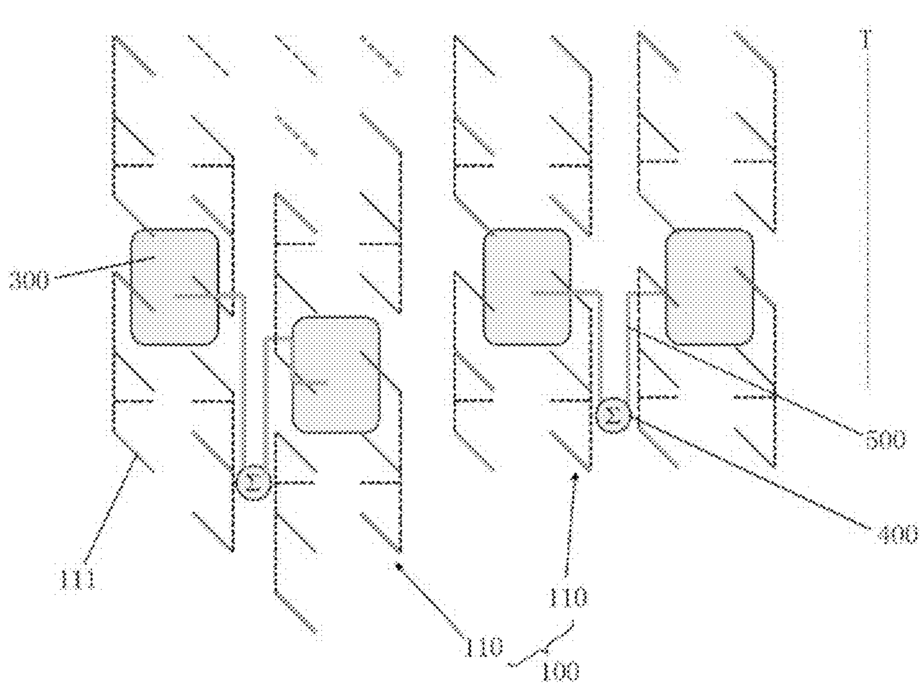
FIG. 1 illustrates a schematic diagram of a staggered structure of an antenna apparatus provided by some embodiments of the present disclosure.
Figure 2:
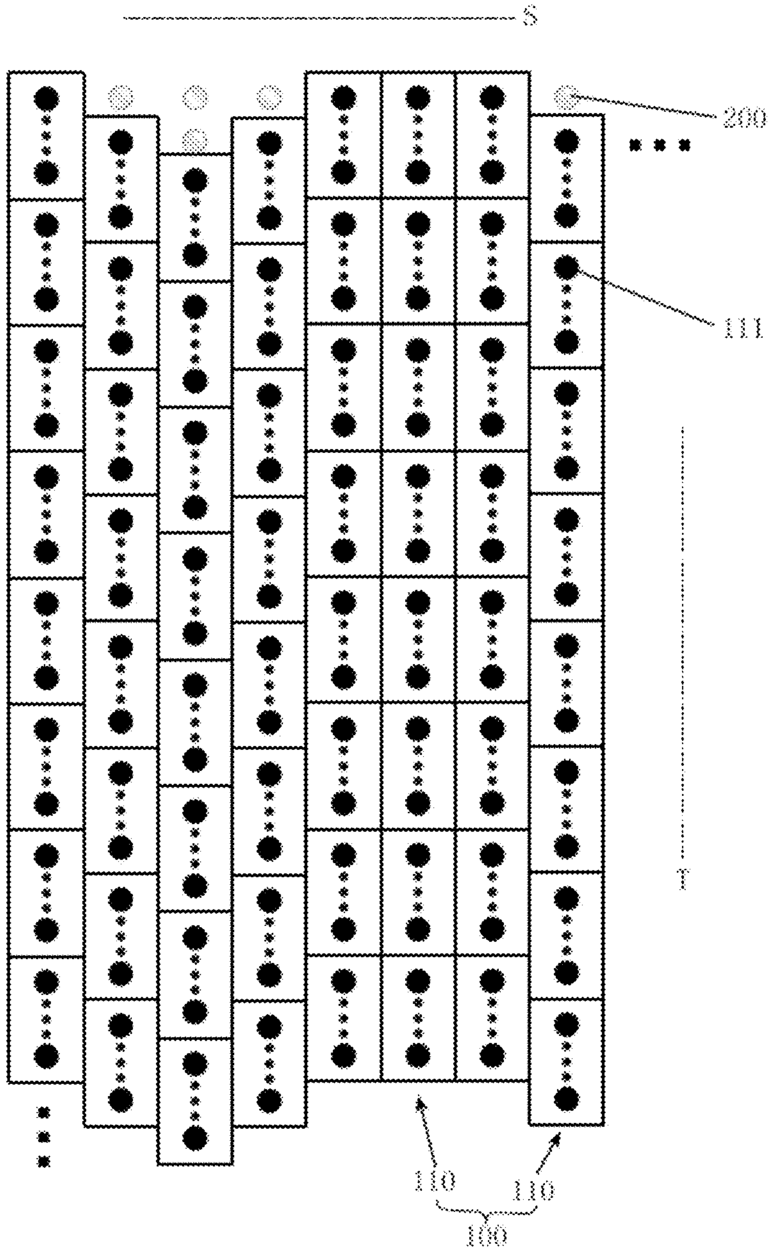
FIG. 2 illustrates a schematic diagram of a further staggered structure of an antenna apparatus provided by some embodiments of the present disclosure.

Some embodiments of the present disclosure provide an antenna apparatus. As shown in FIGS. 1 and 2, the antenna apparatus includes an antenna array 100 including M linear array units 110 arranged and spaced apart from each other in a first direction S, in which each linear array unit 110 includes a plurality of radiation units 111 arranged and spaced apart from each other in a second direction T, and N adjacent linear array units 110 in the antenna array 100 are arranged in a staggered manner in the second direction T, where M and N are both integers greater than 1, and N is less than or equal to M.

In an antenna apparatus provided by some embodiments of the present disclosure, a part or all of the linear array units 110 in the antenna array 100 are staggered in the second direction T. In this way, when the antenna array surface is enlarged to boost the EIRP of the antenna, the regular array surface of the antenna array 100 is changed to an irregular, staggered array surface, and when the antenna beams cover a large angle, more phase granularities (the signal weight of the radiation unit 111 in the linear array unit 110 in the beam forming algorithm) are introduced due to the staggered arrangement of the antenna array surface, to reduce antenna grating lobes during beam scanning at a large angle and increase the coverage of the antenna beams.

It is worth nothing that such optimization of the antenna array is not limited to stagger a part of linear array units 110 in the antenna array 100, but may also include stagger all of the linear array units 110 in the antenna array 100, i.e., causing all the linear array units 110 in the antenna array 100 in a staggered state when N is equal to M. In addition, when a part of the linear array units 110 in the antenna array 100 are staggered, the linear array units 110 therein can move any distance in the second direction T, and it works as long as at least two adjacent linear array units 110 therein are changed from a regular arrangement to an irregular arrangement. In some antenna arrays 100, the positions of the staggered linear array units 110 in the antenna array 100 may not be continuous. For example, in a case where the antenna array 100 includes six linear array units 110, linear array units 110 staggered in the second direction T may include the first three adjacent linear array units 110 and the last two adjacent linear array units 110 in the first direction S. The first direction S and the second direction T may be two directions perpendicular to each other, or two directions intersecting at an acute angle.

After the array surface of the antenna array 100 is staggered, the complexity of the antenna apparatus is increased since the regular arrangement manner of the antenna array surface is changed. For example, the design of the beamforming circuit will be changed depending on the arrangement of the antenna array surface. In order not to cause the antenna apparatus too complicated when staggering is performed on the array surface, any two adjacent linear array units 110 are staggered by the same distance in the linear array units 110 of the antenna array 100 arranged in the staggered manner. As such, the linear array units 110 in the antenna array 100 are staggered uniformly, i.e., the array surface of the antenna array 100 changes uniformly. Therefore, even after the array surface of the antenna array 100 is changed to an irregular, staggered array surface, the linear array units 110 of the antenna array 100 can still be regular in terms of staggered distance, which is advantageous to the design of the beamforming circuit in the antenna apparatus.

In addition, when the linear array units 110 in the antenna array 100 are staggered, different staggered forms may be employed. Therefore, when arranging the beamforming circuit of the antenna apparatus, the design of the beamforming circuit of the antenna apparatus may be made based on different staggered forms. In some embodiments, when N is greater than 2, in the staggered linear array units 110, the staggered direction of the $n^{th}$ linear array unit 110 relative to the $(n-1)^{th}$ linear array unit 110 is the same as the staggered direction of the $(n-1)^{th}$ linear array unit 110 relative to the $(n-2)^{th}$ linear array unit 110, where n is greater than 2, and n is less than or equal to N. In the staggered form of the linear array units 110, they can be arranged and staggered in a stepped shape as the $1^{st}$ to the $3^{rd}$ linear array units 110 from the left in FIG. 1. In some other embodiments, when N is greater than 2, in the staggered linear array units 110, the staggered direction of the $n^{th}$ linear array unit 110 relative to the $(n-1)^{th}$ linear array unit 110 is opposite to the staggered direction of the $(n-1)^{th}$ linear array unit relative to the $(n-2)^{th}$ linear array unit 110, where n is greater than 2, and n is less than or equal to N. In the staggered form of the linear array units 110, they can be arranged and staggered alternately as the $2^{nd}$ to the $4^{th}$ linear array units 110 from the left in FIG. 1.

In an actual application, the vertical surface coverage angle of the communication base station is typically smaller than the horizontal surface coverage angle, and the antenna array 100 therefore can add more radiation units 111 in the vertical direction (i.e., the longitudinal direction) as shown in FIG. 1. In the case, after the radiation units 111 are added to the antenna array 100 in the vertical direction, the diameter of the antenna array surface in the vertical direction will be increased. Meanwhile, the linear array units 110 in the antenna array 100 are arranged in the staggered manner, the grating lobes caused by the increased diameter of the antenna array surface can be reduced, thus increasing the coverage of the antenna beams.

As shown in FIG. 1, in some embodiments, a plurality of radiation units 111 in each linear array unit 110 are spaced equidistantly in the second direction T. In the linear array units 110 arranged in the staggered manner in the antenna array 100, a staggered distance between any two adjacent linear array units 110 is equal to a distance between two adjacent radiation units 1111 in the linear array unit 110. 8 columns of antenna arrays 100 as shown in FIG. 1 are taken here as an example. Each linear array unit 110 is a column in FIG. 1. Six radiation units 111 in each linear array unit 110 are spaced equidistantly. The distance between two adjacent radiation units 111 in each linear array unit 110 is a unit of interval. The second linear array unit 110 from the left side moves downwards by a unit of interval relative to the first linear array unit 110, the third linear array unit 110 moves downwards by two units of interval relative to the first linear array unit 110, and the fourth linear array unit 110 moves downwards by a unit of interval relative to the first linear array unit 110. In this way, although the staggered arrangement is formed on the array surface of the antenna array 100, each linear array unit 110 still contains radiation units 111 in the same transverse direction. This means that the staggered arrangement of a plurality of linear array units 110 in the transverse direction is still regular, which is advantageous to the design of the beamforming circuit in the antenna apparatus.

After the array surface of the antenna array 100 is arranged in the staggered manner, the boundary of the antenna array 100 may be broken. That is, as shown in FIG. 2, when the second to the fourth linear array units 110 from the left side are staggered in the second direction T (i.e., the longitudinal direction as shown in FIG. 2), the boundary of the antenna array 100 is broken at the upper side of the second to the fourth linear array units 110. In order to ensure the completeness of the boundary of the antenna array 100, the antenna apparatus may further include at least one virtual radiation unit 200 that is radiation unit(s) 111 not connected to the antenna feed network. The virtual radiation unit 200 is disposed adjacent to the radiation unit 111, outermost in the second direction T, of the linear array units 110 arranged in the staggered manner, and the virtual radiation unit 200 and the linear array unit 110 are arranged sequentially in the second direction T. For example, when any one of the linear array units 110 is staggered by a unit of interval, at least one virtual radiation unit 200 and the linear array unit 110 may be arranged sequentially in the second direction T (i.e., the virtual radiation unit 200 arranged at the upper side of the second to the fourth linear radiation units 110 from the left as shown in FIG. 1 or 2). At this time, the number of virtual radiation units 200 correspond to the movement distance of the linear array unit 110, and a unit of interval corresponds to a virtual radiation unit 200.

Figure 3:
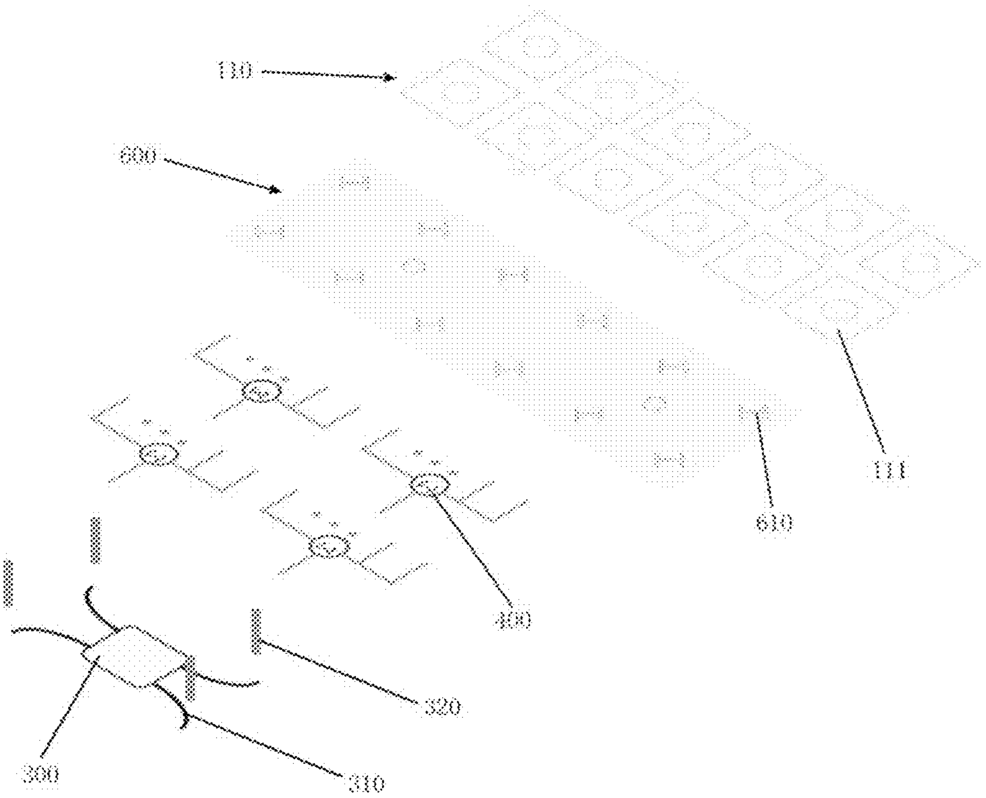
FIG. 3 illustrates a schematic diagram of a feed control structure of an antenna apparatus provided by some embodiments of the present disclosure.

In addition, the antenna apparatus according to some embodiments of the present disclosure may also include a beamforming circuit corresponding to the antenna array surface. As shown in FIGS. 1 and 3, the beamforming circuit includes a plurality of beamforming chips 300 each including X transmission ports (not shown), where each transport port is connected to a power divider 400 via a transmission line 310, and each power divider 400 is configured to feed Y radiation units 111 in one of the linear array units 110 of the antenna array 100, in which X and Y are both integers greater than or equal to 1, Y is less than a number of the plurality of radiation units 111 in each linear array unit 110, and a product of X, Y and the number of the plurality of beamforming chips 300 is equal to a total number of the radiation units 111 in the antenna array 100. The beamforming chip 300 is integrated with a shifter circuit and a millimeter wave transceiver front-end circuit. The beamforming circuit can adjust, via the power divider 400, a phase and an amplitude of a signal transmitted by a radiation unit 111 in the antenna array 100, and the shifter can adjust a downtilt angle of the antenna apparatus.

In some embodiments, the plurality of beamforming chips 300 are arranged in a matrix shape in the first direction S and the second direction T. In a plurality of rows of beamforming chips 300 arranged in the first direction S, at least two adjacent rows of beamforming chips 300 are staggered in the second direction T, and the staggered distance between two adjacent beamforming chips 300 in the first direction S is the same as the staggered distance between any two adjacent linear array units 110. In this way, beamforming chips 300 arranged in a staggered manner can be designed based on the staggered array surface of the antenna array 100, guaranteeing that a circuit of each beamforming chip 300 is located in a center position of a plane where a plurality of radiation units 111 fed via respective power dividers 400 are located, to ensure that the beamforming circuit has a low design complexity after the array surface of the antenna array 100 is arranged in the staggered manner. An integration design concept is employed for the antenna array surface and the beamforming circuit, and a staggered arrangement solution of the beamforming circuit is taken into consideration when arranging the array surface of the antenna array 100 in the staggered manner, to ensure that the beamforming system has a low design complexity. Meanwhile, beamforming chips 300 of an integrated design can ensure that the beamforming circuit has a high integration degree.

In some embodiments, the radiation unit 111 in the antenna array 100 may be in the form of a radiation patch, and a parasitic patch may also be added to the radiation unit 111 to increase the impedance bandwidth of the radiation unit 111. In some other embodiments, in addition to the form of patch, the radiation unit 111 may also be a slot antenna, a cavity-backed patch antenna, a cavity-backed slot antenna, or other plane antenna.

In addition, the radiation unit 111 may use coupling feeding, i.e., the antenna apparatus may further include a dielectric substrate 600 on which a plurality of coupling slots 610 one-to-one corresponding to a plurality of radiation units 111 in each linear array unit 110, where each power divider 400 feeds, via a coupling slot 610, a respective radiation unit 111 corresponding to the coupling slot 610. Each coupling slot 610 may be of an I-shape. With the I-shaped coupling slot 610, the impedance bandwidth of the antenna can be broadened. Meanwhile, the coupling slot 610 can be arranged in the 45-degree direction in FIG. 3, to implement polarization of the radiation unit 111 in the 45-degree direction in FIG. 3. It is to be understood that the radiation unit 111 may also use coaxial feeding.

In some embodiments, the staggered beamforming circuits of the antenna apparatus may be integrated on a circuit board. With X being 4, and Y being 3, the structure of the beamforming circuit in the antenna apparatus as shown in FIG. 3 is described. Wherein, each beamforming chip 300 is integrated with four shifter circuits and a millimeter wave transceiver front-end circuit, four paths of front end circuit pins of each beamforming chip 300 fan out via four transmission lines 310, the fan-out transmission lines 310 and the beamforming chip 300 are all located at the circuit board bottom layer, a tip of each transmission line 310 is connected through a signal via 320 upwards to a 1-into-3 power divider 400 which is of a design with equal power and equal phase, to ensure that each path of shifter and the transceiver front-end circuit drive three radiation units 111 arranged vertically, and an output port of each 1-into-3 power divider 400 passes through the coupling slot 610 to feed the feeding unit 111. In addition, the circuit board may be formed by laminating two sheets of completely symmetrical multi-sheet hybrid plates, where the staggered antenna array surface may be arranged on the top hybrid plate of the circuit board, and the beamforming circuits and the power dividing network may be arranged on the bottom hybrid plate of the circuit board.

Figure 4:
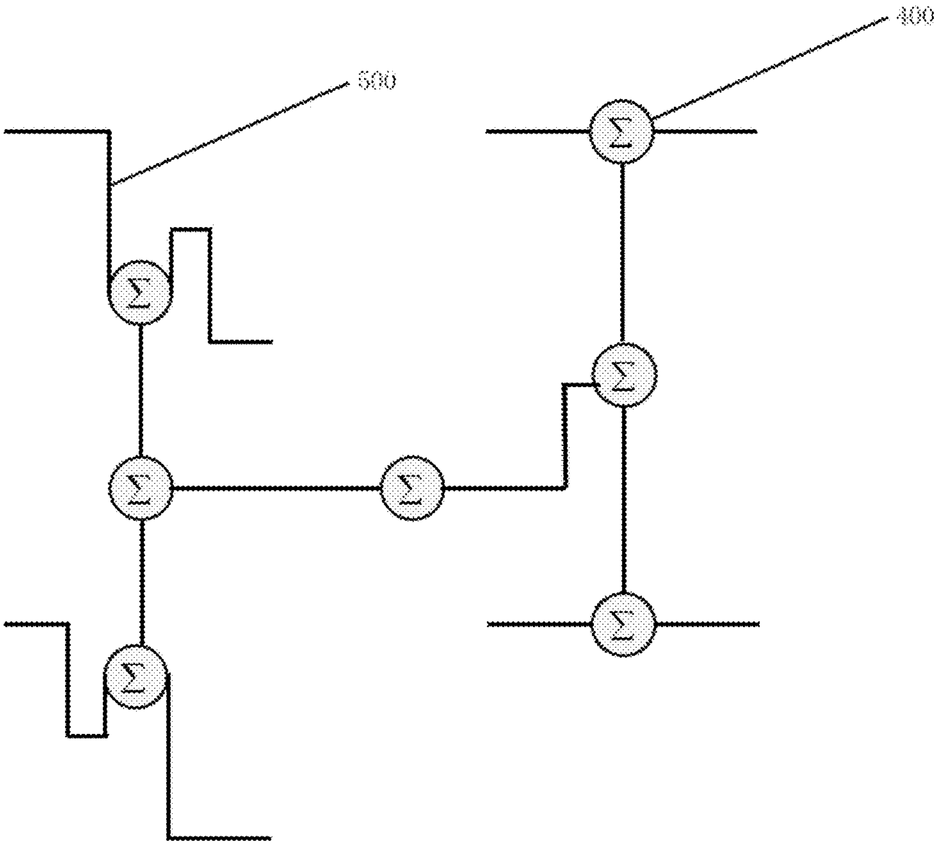
FIG. 4 illustrates a schematic diagram of a structure of a 1-into-4 power dividing network in an antenna apparatus provided by some embodiments of the present disclosure.

Moreover, two beamforming chips 300 in the antenna apparatus adjacent in the first direction S are connected via the power dividing network. In order to connect the two beamforming chips 300 adjacent in the first direction S, in some embodiments, the antenna apparatus may further include a plurality of electrical branches 500, where each electrical branch 500 is connected to the two beamforming chips 300 adjacent in the first direction S, and the electrical branch 500 outermost in the second direction T is arranged in a bent form. As such, only the electrical branch 500 outermost in the second direction T is bent, but the middle electrical branches 500 in the second direction T are still of a flat structure (i.e., a linear structure), to thus reduce the impact on the antenna transmission bandwidth and flatness. FIG. 4 illustrates a structure of a 1-into-4 power dividing network. Two beamforming chips 300 adjacent in the first direction S are connected via the electrical branch 500 in FIG. 4. If the two beamforming chips 300 adjacent in the first direction S are in the same transverse direction, they may be connected via a straight electrical branch 500; if the two beamforming chips 300 adjacent in the first direction S are in different transverse directions, they may be connected via a bent electrical branch 500 (as shown in FIG. 1). The 1-into-4 power dividing network in FIG. 4 further includes a power divider 400 for processing signals.

Figure 5:
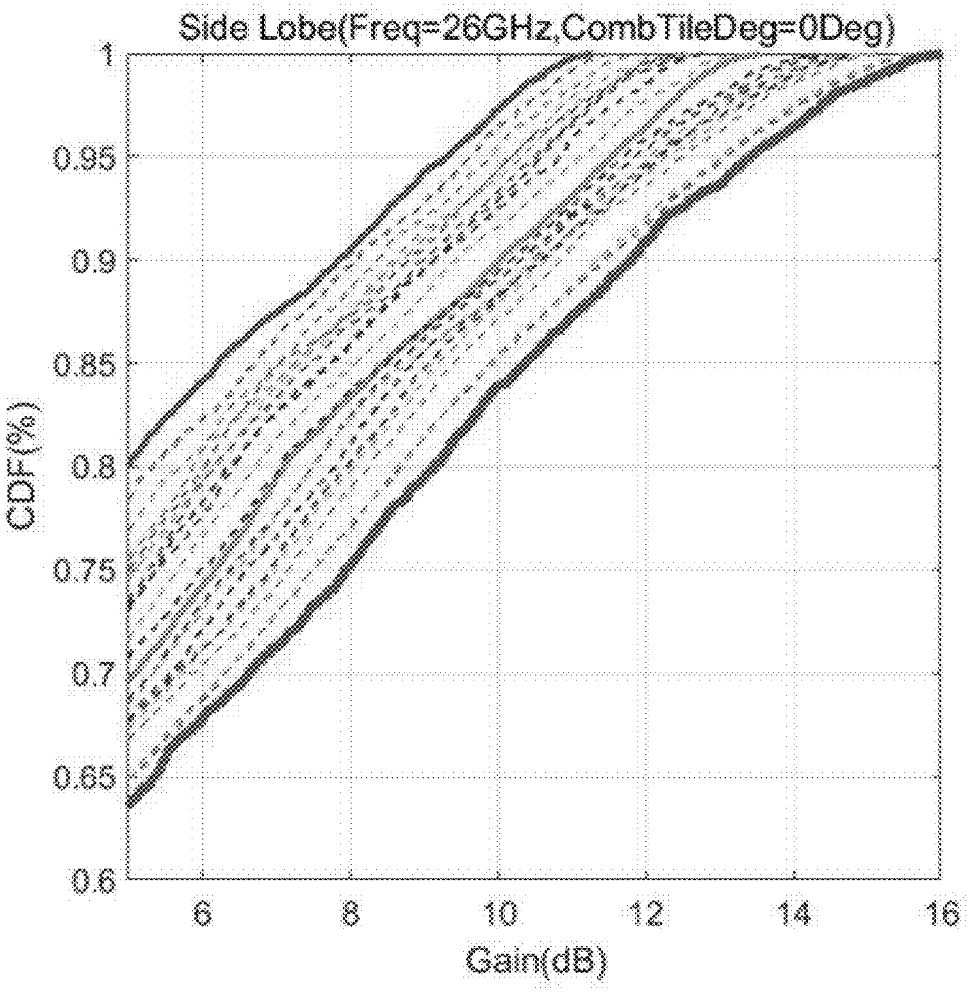
FIG. 5 is a comparison graph of simulation results of an antenna apparatus provided by some embodiments of the present disclosure and an antenna apparatus with a regular arrangement.

FIG. 5 illustrates a comparison graph of simulation results of an antenna apparatus provided by some embodiments of the present disclosure and an antenna apparatus with a regular arrangement. In FIG. 5, the abscissa represents an antenna gain measured in dB (decibel), and the ordinate represents a Cumulative Distribution Function. The gain when CDF is 1 is a gating lobe size at the maximum scanning angle of the antenna. In FIG. 5, the top curve indicates a grating lobe size at a maximum scanning angle of an antenna apparatus in a staggered arrangement form, while the bottom curve shows a grating lobe size at a maximum scanning angle of an antenna apparatus in a regular arrangement form. It can be seen therefrom that the antenna apparatus in the staggered arrangement has a maximum grating lobe of 11 dB while the antenna apparatus in the regular arrangement has a maximum grating lobe of 16 dB; as compared to the antenna apparatus in the regular arrangement, the antenna apparatus in the staggered arrangement optimizes the grating lobe at the maximum scanning angle by 5 dB.

Some embodiments of the present disclosure further provide a base station antenna including the antenna apparatus as described in the above embodiments, where linear array units 110 of the antenna array 100 are arranged in a staggered manner. In this way, a number of radiation units 111 can be increased in the second direction T, to effectively reduce the grating lobes during scanning of antenna beams at a large angle and enlarge the coverage of the antenna beams while improving the EIRP of the antenna.

It would be understood by the ordinary skilled in the art that the implementations as described above are only specific embodiments of the present disclosure, and in actual application, various variations may be allowed with respect to form and detail, without departing scope of the present disclosure.

I claim:

1. An antenna apparatus, comprising:

an antenna array comprising M linear array units arranged and spaced apart from each other in a first direction, each of the linear array units comprising a plurality of radiation units arranged and spaced apart from each other in a second direction, N of the linear array units adjacent in the antenna array being arranged in a staggered manner in the second direction, where the M and the N are both integers greater than 1, and the N is less than or equal to the M; and a beamforming chip array, the beamforming chip array and the N of the linear array units adjacent being arranged in a staggered manner collaboratively, and a distance staggered arranged is the same as a staggered distance between the linear array units.

2. The antenna apparatus of claim 1, wherein:

in the linear array units arranged in the staggered manner, a staggered distance between any two of the linear array units adjacent is the same.

3. The antenna apparatus of claim 2, wherein:

the plurality of radiation units in each of the linear array units are spaced equidistantly in the second direction, and a staggered distance between any two of the linear array units adjacent in the linear array units arranged in the staggered manner is equal to a distance between two of the radiation units adjacent in each of the linear array units.

4. The antenna apparatus of claim 1, wherein:

the N is greater than 2, and a staggered direction of an $n^{th}$ linear array unit in the linear array units arranged in the staggered manner relative to an $(n-1)^{th}$ linear array unit is the same as a staggered direction of the $(n-1)^{th}$ linear array unit relative to an $(n-2)^{th}$ linear array unit, where n is greater than 2, and n is less than or equal to the N.

5. The antenna apparatus of claim 1, wherein:

the N is greater than 2, and a staggered direction of an nth linear array unit in the linear array units arranged in the staggered manner relative to an $(n-1)^{th}$ linear array unit is opposite to a staggered direction of the $(n-1)^{th}$ linear array unit relative to an $(n-2)^{th}$ linear array unit, where n is greater than 2, and n is less than or equal to the N.

6. The antenna apparatus of claim 1, further comprising:

a plurality of beamforming chips, each of the plurality of beamforming chips having X transmission ports, each of the transmission ports being connected with a power divider, each power divider being configured to feed Y of the radiation units in one of the linear array units, wherein the X and the Y are both an integer greater than or equal to 1, the Y is less than or equal to a number of the plurality of radiation units in each of the linear array units, and a product of the X, the Y and a number of the plurality of beamforming chips is equal to a number of the radiation units in the antenna array.

7. The antenna apparatus of claim 6, wherein:

the plurality of beamforming chips are arranged in a matrix shape in the first direction and the second direction, at least two adjacent rows of the beamforming chips in a plurality of rows of the beamforming chips arranged in the first direction are staggered arranged in the second direction, and a staggered distance between two rows of the beamforming chips adjacent in the first direction is the same as a staggered distance between any two of the linear array units adjacent.

8. The antenna apparatus of claim 7, further comprising:

a plurality of electrical branches, each of the electrical branches being connected to two of the beamforming chips adjacent in the first direction, and the electrical branch outermost in the second direction being arranged in a bent form.

9. The antenna apparatus of claim 6, further comprising:

a dielectric substrate, a plurality of coupling slots one-to-one corresponding to the plurality of radiation units in each of the linear array units being arranged on the dielectric substrate, each power divider feeding, via the coupling slot, the radiation unit corresponding to the coupling slot.

10. A base station antenna, comprising:

an antenna apparatus, comprising:

an antenna array comprising M linear array units arranged and spaced apart from each other in a first direction, each of the linear array units comprising a plurality of radiation units arranged and spaced apart from each other in a second direction, N of the linear array units adjacent in the antenna array being arranged in a staggered manner in the second direction, where the M and the N are both integers greater than 1, and the N is less than or equal to the M; and a beamforming chip array, the beamforming chip array and the N of the linear array units adjacent being arranged in a staggered manner collaboratively, and a distance staggered arranged is the same as a staggered distance between the linear array units.

11. The base station antenna of claim 10, wherein:

the M is 8, and the N is 5, first through third linear array units in the N linear array units are sequentially staggered by a same distance in a first staggered direction, wherein third through fifth linear array units in the N array linear units are sequentially staggered by the same distance in a second staggered direction, the first staggered direction being different from the second staggered direction.

12. The base station antenna of claim 10, further comprising:

at least one virtual radiation unit, wherein the virtual radiation unit is not connected to an antenna feed network, and one of the at least virtual radiation unit occupies a radiation unit position.

13. The base station antenna of claim 12, wherein:

the at least one virtual radiation unit is arranged adjacent to the radiation unit, outermost in the second direction, of the linear array units arranged in the staggered manner, and the at least one virtual radiation unit and the linear array units are arranged sequentially in the second direction.

14. The base station antenna of claim 13, wherein a number of the at least one virtual radiation units corresponds to a movement distance size of the linear array units.

15. The base station antenna of claim 13, wherein:

the virtual radiation unit is arranged adjacent to the radiation unit, outermost in the second direction, of the N of the linear array units adjacent, and the virtual radiation unit is located at an edge of the antenna array.

16. The base station antenna of claim 10, wherein:

the radiation units in each of the linear array units are arranged continuously and are the same in terms of number.

* * * * *